(No Model.)
W. M. THOMAS.
ELECTRIC CUT-OUT.
No. 316,502. Patented Apr. 28, 1885.
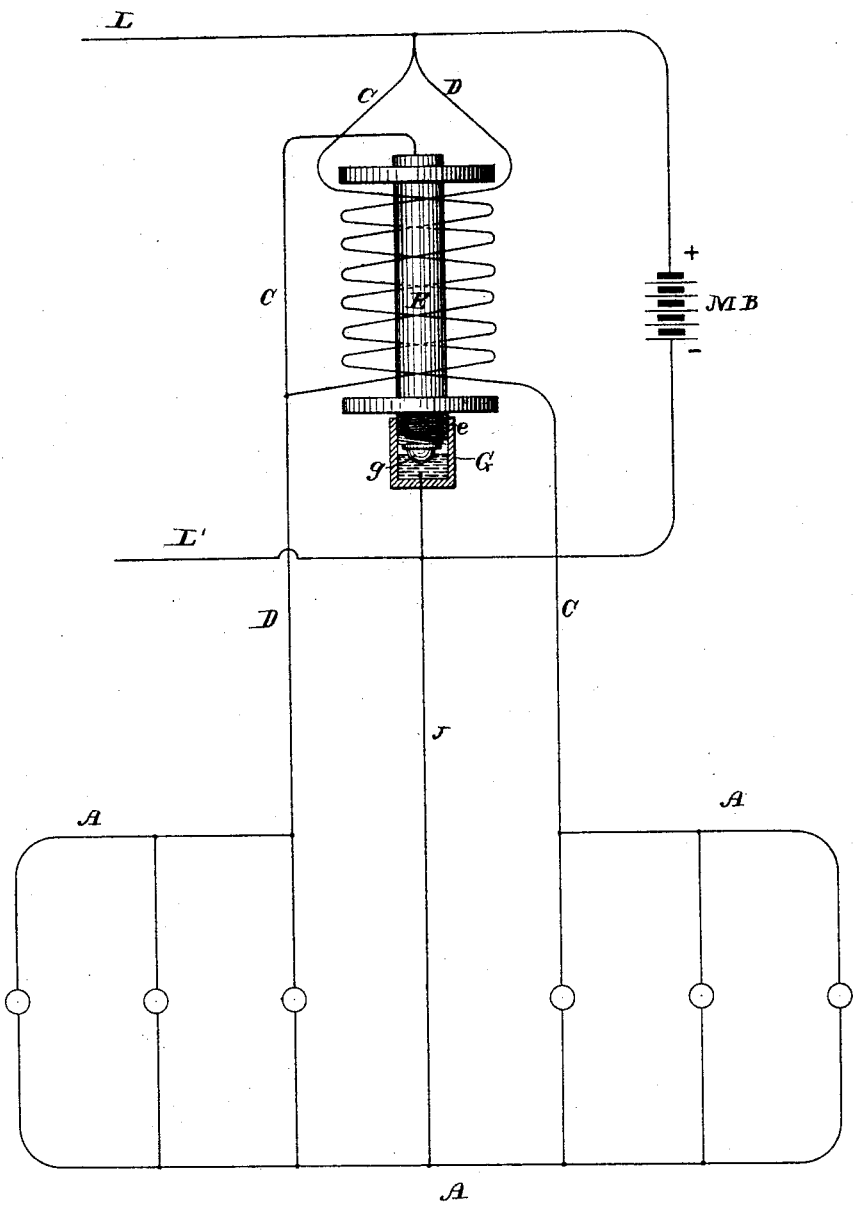
WITNESSES
Ed. A. Newman,
Al. C. Newman,
INVENTOR
Wm. M. Thomas
By his Attorneys
Baldwin, Hopkins & Peyton.

UNITED STATES PATENT OFFICE.

WILLIAM M. THOMAS, OF GRAND RAPIDS, MICHIGAN, ASSIGNOR OF ONE-HALF TO THE GRAND RAPIDS ELECTRIC LIGHT AND POWER COMPANY, OF SAME PLACE.

ELECTRIC CUT-OUT.

SPECIFICATION forming part of Letters Patent No. 316,502, dated April 28, 1885.

Application filed November 24, 1884. (No model.)

*To all whom it may concern:*

Be it known that I, WILLIAM M. THOMAS, of Grand Rapids, Kent county, Michigan, have invented a new and useful Improvement in Electric Cut-Outs, of which the following is a specification.

My invention relates to that class of automatic cut-outs which are specially designed for electric lighting, but which may be used for other purposes, and which are intended to short-circuit the current of the main line whenever a lamp or series of lamps give out; and the invention consists in the use of a floating cut-out armature instead of the ordinary armatures which have heretofore been used.

In the drawing I have shown my improvement as applied to the cut-out on which Letters Patent No. 300,532 were granted to me June 17, 1884. It is specially well adapted for use in connection with such apparatus, though obviously it may be used in other organizations.

The accompanying drawing is a diagram view illustrating the invention.

M B represent any suitable source of electric energy, and A A groups of lamps, which are shown as connected with the main generator-wires L L' in multiple-arc circuit. From the positive pole of the source of electric energy two branches, C D, are taken. These branches are wound in opposite directions around the core of the cut-out magnet E, and thence to the groups of lamps which are shown as connected in multiple arc in each loop, and then by a common wire, $f$, to the opposite pole of the source of electric energy. The wire $f$, or, in other words, the line L' of the main circuit, is connected with the mercury in the cup G, which is preferably supported by the lower end of the core of the cut-out magnet. The cup is shown as internally screw-threaded and secured on an insulated ring, $e$, on the end of the core of the cut-out magnet. Within this cup of mercury is a cut-out armature, $g$, which may be of any suitable shape; but is shown as, and is preferably, hemispherical. One of the wires C or D, after it leaves the coil of the magnet E, may be connected by a wire, $c$, with the core of the magnet E. The wire C is shown as so connected. Obviously, as long as the two groups A of lamps are burning with approximately equal resistance, and the resistance in the wires C D is approximately equal, the current from the line L will flow equally in the two conductors C and D around the core of the magnet E, which will therefore be neutral, and thence by wire $f$ to the opposite main line L'. With the magnet in a neutral condition the armature $g$ will float on the mercury in the cup G, out of contact with the core of the magnet E. Should a lamp give out in either of the loops C or D, a greater current will flow in one of the conductors C or D than in the other one. The core of the magnet E will consequently be energized, and the armature $g$ will be attracted against the core of the magnet, but not out of contact with the mercury. The entire current will therefore pass by way of the conductor D, line $c$, core of magnet, armature, and mercury to the opposite main line L', so that the lamps or other appliances will be cut out of circuit.

By screwing up or loosening the mercury-cup on the pole of the magnet the float may be adjusted relatively to the pole of the magnet so as to act when a given variation of resistance in the two lines C D has occurred.

I prefer to make the cup G of some non-magnetic metal. Obviously such a floating cut-out may be used either with multiple arc or series cut-outs.

I claim as my invention—

1. The combination, with an automatic cut-out magnet, of a floating cut-out armature and their electric connections.

2. The combination of the differentially-wound cut-out magnet, the mercury-cup, the floating armature within the cup, and electric circuits, substantially as described.

In testimony whereof I have hereunto subscribed my name.

W. M. THOMAS.

Witnesses:
    WM. H. POWERS,
    WM. E. COX.